United States Patent
Jiang et al.

(10) Patent No.: US 10,759,818 B2
(45) Date of Patent: Sep. 1, 2020

(54) SIMPLE PREPARATION METHOD FOR DIALKOXYPROPYL METHYLPHOSPHONATE

(71) Applicant: JIANGSU GOOD HARVEST-WEIEN AGROCHEMICAL CO., LTD, Nantong (CN)

(72) Inventors: Lian Jiang, Nantong (CN); Weiwei Liu, Nantong (CN)

(73) Assignee: JIANGSU GOOD HARVEST-WEIEN AGROCHEMICAL CO., LTD, Nantong (CN)

( * ) Notice: Subject to any disclaimer, the term of this patent is extended or adjusted under 35 U.S.C. 154(b) by 6 days.

(21) Appl. No.: 16/331,949

(22) PCT Filed: Sep. 13, 2018

(86) PCT No.: PCT/CN2018/105359
§ 371 (c)(1),
(2) Date: Mar. 8, 2019

(87) PCT Pub. No.: WO2019/034182
PCT Pub. Date: Feb. 21, 2019

(65) Prior Publication Data
US 2019/0284215 A1    Sep. 19, 2019

(30) Foreign Application Priority Data
Aug. 8, 2018 (CN) .......................... 2018 1 0893873

(51) Int. Cl.
C07F 9/54 (2006.01)
C07F 9/655 (2006.01)
C07F 9/32 (2006.01)

(52) U.S. Cl.
CPC .............. *C07F 9/5428* (2013.01); *C07F 9/32* (2013.01); *C07F 9/6552* (2013.01); *C07F 9/65515* (2013.01)

(58) Field of Classification Search
CPC ..................................................... C07F 9/5428
See application file for complete search history.

(56) References Cited

U.S. PATENT DOCUMENTS 6,359,162 B1 *   3/2002   Willms .................. C07F 9/301
                                                           558/82

* cited by examiner

*Primary Examiner* — Golam M Shameem
(74) *Attorney, Agent, or Firm* — CBM Patent Consulting, LLC

(57) ABSTRACT

A simple preparation method for a dialkoxypropyl methylphosphonate, wherein a methyl halogenated phosphonate monoester is reacted with a 3,3-dialkoxypropyl magnesium or zinc halide to obtain a 3,3-dialkoxypropyl methylphosphonate. The starting materials are readily available, the operations are simple, the conditions are mild, the synthesis conversion rate is high, and the method is suitable for industrial production.

9 Claims, No Drawings

SIMPLE PREPARATION METHOD FOR DIALKOXYPROPYL METHYLPHOSPHONATE

TECHNICAL FIELD

The present invention relates to a preparation method for 3,3-dialkoxypropyl methylphosphonate.

DESCRIPTION OF RELATED ART

Glufosinate, also known as phosphinothricin, has a chemical structure of 4-[hydroxy(methyl)phosphono]-DL-homoalanine. Hoechst developed glufosinate as a highly efficient, broad-spectrum and low-toxic non-selective herbicide. As a sterilant herbicide, glufosinate has a significant herbicidal effect. With the ban and restriction of paraquat worldwide and the emergence of large amounts of glyphosate resistant weeds, the market demand for glufosinate is growing. Although glufosinate has been reported to have several synthetic routes, such as Gabriel-Methyl Malonate, Neber Rearrangement, Arbuzov, Bucherer-Bergs methods and a high-pressure hydrogen catalysis method, the current domestic industrialization mainly uses a traditional Strecker route.

The synthetic route is as follows:

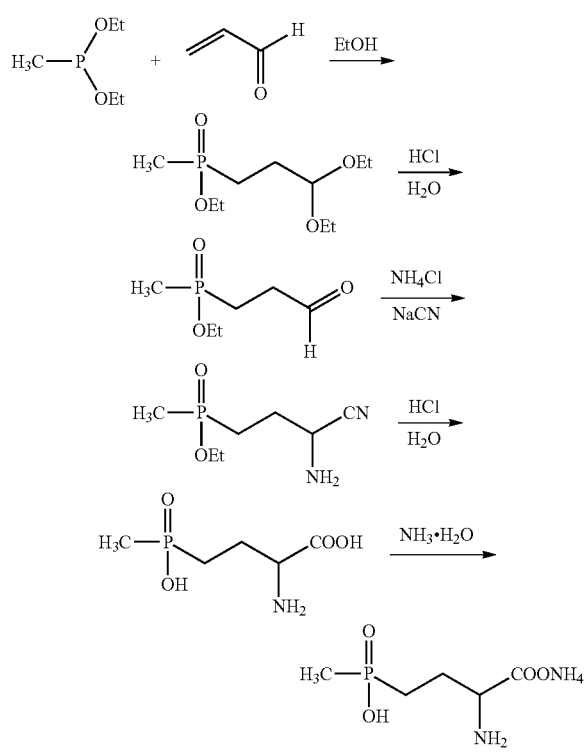

wherein 3,3-dialkoxypropyl methylphosphonate, as a key intermediate in the Strecker route, has many synthetic methods.

Gruszecka et al. (Gruszecka E, Soroko M. Preparation of D, L-Phosphinothricin by Strecker Reaction [J]. Pol J Chem, 1979, 53(4):937-939.) reported in 1975 that using ethanol as a solvent, 3-bromopropenal reacts with diethyl methylphosphinate to obtain 3,3-ethyl dialkoxypropyl methylphosphonate, with the reaction formula as follows:

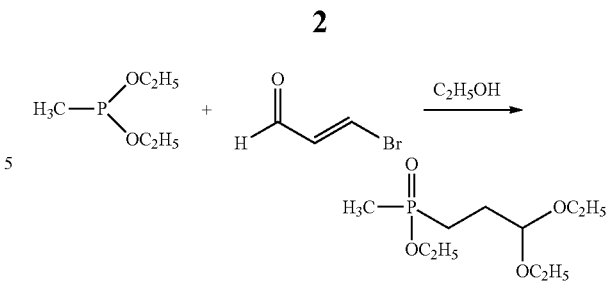

Lothar Willms (U.S. Pat. No. 6,359,162 B1) et al. reported that diethyl methylphosphinate reacts with acrolein and ethanol under the action of acetic anhydride to obtain 3,3-ethyl diethoxypropyl methylphosphonate, with the reaction formula as follows:

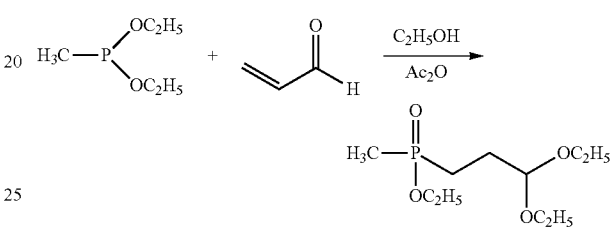

Zhu Youquan (CN 10141803) et al. used 3-bromopropanal diethyl acetal reacted with diethyl methylphosphinate to obtain 3,3-ethyl diethoxypropyl methylphosphonate, with the reaction formula as follows:

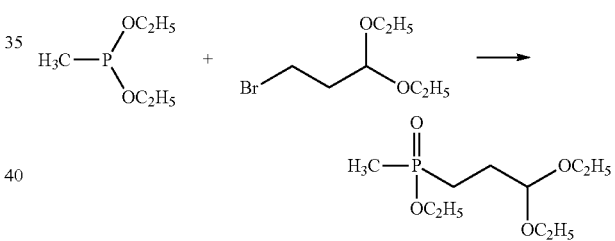

Boehshar et al. (DE 3900331:A) reported in 1990 that monobutyl methylphosphinate reacts with 3,3-butyl diethoxypropene and methyl phosphinate under the action of a free radical initiator to obtain 3,3-butyl diethoxypropyl methylphosphonate.

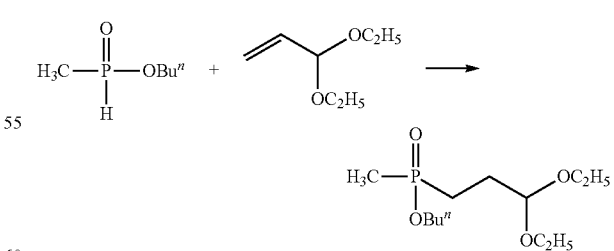

Currently, the industrial preparation route at home and abroad mainly uses diethyl methylphosphinate and monobutyl phosphinate as a source of raw materials for the synthesis of a glufosinate group. Although diethyl methylphosphinate has been industrialized in China, the existing industrial preparations have many disadvantages: the products are unstable and deteriorate easily, are extremely easy to burn in the air and difficult to synthesize, the synthesis equipment is cumbersome, the overall industrial preparation cost is high, and the wastes are serious. The industrial product of butyl methyl phosphinate is not easy to obtain. Many of the above shortcomings and problems restricted the development of the glufosinate industry. Therefore, it is especially important to seek a rational industrial approach with readily available raw materials, simple synthesis, rational costs, simple and easy conditions, high safety factor and less wastes. The present patent is designed according to the above idea.

Technical Issues

The objective of the present invention is to provide a novel preparation method of 3,3-dialkoxypropyl methylphosphonate, a key intermediate of glufosinate, in view of the shortcomings and disadvantages of the existing glufosinate synthesis route. The starting materials are readily available, the operations are simple, the conditions are mild, the synthesis conversion rate is high, and the method is suitable for industrial production. The method is a reasonable industrialization route for synthesizing a glufosinate.

Technical Solution

The details are described as follows: the typical reaction equation is as follows:

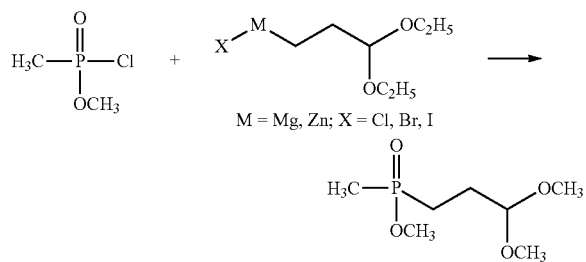

wherein methyl chlorophosphonate monoester can be easily synthesized from a flame retardant of dimethyl methylphosphonate (DMMP) by phosphorus pentachloride. The Grignard reagent or the zinc reagent can be easily obtained from a halogenated propionaldehyde diol.

A simple preparation method for a 3,3-dialkoxypropyl methylphosphonate, characterized in that it comprises the following steps:

a methyl halogenated phosphonate monoester is reacted with a 3,3-dialkoxypropyl magnesium or zinc halide to obtain a 3,3-dialkoxypropyl methylphosphonate, with the reaction equation as shown in the following (I):

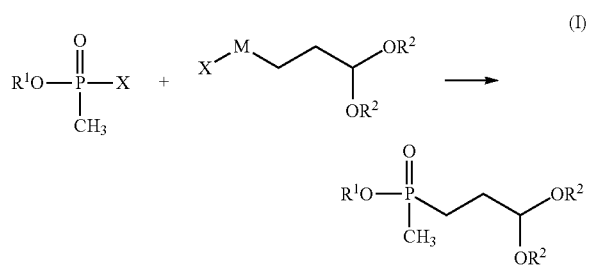

wherein $R^1$ and $R^2$ are respectively an alkyl group of C1~C5, and $R^1$ and $R^2$ can be the same or different;

X is a halogen chlorine, bromine or iodine, and M is a metal magnesium or zinc.

The two $R^2$ groups may also be attached to the oxygen atom in a form of methylene, or —$(CH_2)n$-, to form a 3~6-membered cyclic structure, wherein n=2, 3.

The cyclic structure is

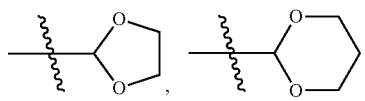

or has a branched cyclic structure.

The branched annular structure is

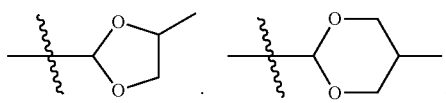

The temperature at which the methylhalophosphonate monoester in Reaction Formula (I) reacts with 3,3-dialkoxypropyl magnesium or zinc halide is −78° C.~80° C.

The molar ratio of the methylhalophosphonate monoester to 3,3-dialkoxypropyl magnesium or zinc halide in Reaction Formula (I) is 1 mol:0.5~5 mol.

The reaction time of the methylhalophosphonate monoester and 3,3-dialkoxypropyl magnesium or zinc halide in Reaction Formula (I) is 0.005~72 hours.

In Reaction Formula (I), the reaction solvent is a dialkyl ether or a mixed dialkyl ether (such as methyl ether, diethyl ether, diisopropyl ether, di-n-butyl ether, methyl ethyl ether, methyl isopropyl ether), a cycloalkane ether (such as tetrahydrofuran, dioxane), aromatic ethers (such as methyl phenyl ether, diphenyl ether), ethylene glycol diether (such as ethylene glycol dimethyl ether, ethylene glycol diethyl ether), alkanes (such as n-pentane, n-hexane, cyclopentane, cyclohexane, decahydronaphthalene), aromatic hydrocarbons (such as benzene, toluene, xylene, ethylbenzene) or petroleum ether, silyl ether, gasoline solvent, or one or more of the combinations thereof.

Beneficial Effects

The starting materials are readily available, the operations are simple, the conditions are mild, the synthesis conversion rate is high, and the method is suitable for industrial production.

DETAILED DESCRIPTION OF THE INVENTION

Embodiment 1

Preparation of 3,3-diethoxypropyl Magnesium Chloride 4.0 g of magnesium dust and 100 mL of diethyl ether were added into a 250 mL four-necked round-bottom flask. Under the condition of nitrogen protection, the temperature was raised to 66° C., and small iodines were added for an initiation; after the initiation, a solution of 30 mL of diethyl ether containing 21 g of 1-chloro-3,3-diethoxypropane was added dropwise under a slightly boiling state, and then 40 mL of diethyl ether was added dropwise; the reaction was kept at 25° C. for 1 h to obtain a solution of 3,3-diethoxypropyl magnesium chloride diethyl ether.

Preparation of 3,3-methyl Diethoxypropyl Methylphosphonate

Under the protection of nitrogen, 20.5 g of methyl chlorophosphonate monoester and 30 mL of diethyl ether were added to a 250 mL three-necked flask; when the temperature was lowered to −78° C., a solution of 3,3-diethoxypropyl magnesium chloride diethyl ether was added dropwise, and after the addition, the reaction was kept at 0° C. for 2 h. The mixture was extracted with a saturated solution of ammonium chloride, and the mixture was kept still and partitioned; the organic layer was collected, the aqueous layer was extracted with 30 mL×2 of ethyl acetate, the organic layer was combined, and ethyl acetate was concentrated by a vacuum rotation and distilled under a reduced pressure to obtain 26 g of 3,3-methyl diethoxypropyl methylphosphonate, with an HPLC purity of 95% and a reaction yield of 90%.

Embodiment 2

Preparation of 3,3-diethoxypropyl Magnesium Bromide 4.0 g of magnesium dust and 50 mL of tetrahydrofuran were added into a 250 mL four-necked flask. Under the protection of nitrogen, the temperature was raised to 66° C., and small iodines were added for an initiation; after the initiation, a solution of 60 mL of tetrahydrofuran containing 21 g of 1-bromo-3,3-diethoxypropane was added dropwise under a slightly boiling state, and then 40 mL of tetrahydrofuran was added dropwise; the reaction was kept at 25° C. for 1 h to obtain a solution of 3,3-diethoxypropyl magnesium bromide tetrahydrofuran.

Preparation of 3,3-methyl Diethoxypropyl Methylphosphonate

Under the protection of nitrogen, 19.3 g of methyl chlorophosphonate monoester and 30 mL of tetrahydrofuran were added to a 250 mL three-necked flask; when the temperature was lowered to −78° C., a solution of 3,3-diethoxypropyl magnesium bromide tetrahydrofuran was added dropwise, and after the addition, the reaction was kept at 0° C. for 2 h. The mixture was extracted with a saturated solution of catalytic amine, and the mixture was kept still and partitioned; the organic layer was collected, the aqueous layer was extracted with 30 mL×2 of ethyl acetate, and ethyl acetate was concentrated by a vacuum rotation in the organic layer and distilled under a reduced pressure to obtain 28 g of 3,3-methyl diethoxypropyl methylphosphonate, with an HPLC purity of 95% and a reaction yield of 92%.

Embodiment 3

Preparation of 3,3-diethoxypropyl Zinc Bromide (Zinc Powder Method)

10.7 g of zinc powder and 50 mL of tetrahydrofuran were added into a 250 mL four-necked flask. Under the protection of nitrogen, the temperature was raised to 40° C., and a solution of 60 mL of tetrahydrofuran containing 21 g of 1-bromo-3,3-diethoxypropane was added dropwise, and then 60 mL of tetrahydrofuran was added dropwise; the reaction was kept at 40° C. for 1 h to obtain a solution of 3,3-diethoxypropyl zinc bromide tetrahydrofuran.

Preparation of 3,3-diethoxypropyl Zinc Bromide (Zinc Chloride Method)

4.0 g of magnesium dust and 50 mL of tetrahydrofuran were added into a 250 mL four-necked flask. Under the protection of nitrogen, the temperature was raised to 50° C., and small iodines were added for an initiation; after the initiation, a solution of 50 mL of tetrahydrofuran containing 21 g of 1-bromo-3,3-diethoxypropane was added dropwise under a slightly boiling state, and then 30 mL of tetrahydrofuran was added dropwise; the reaction was kept at 25° C. for 1 h to obtain a solution of 3,3-diethoxypropyl magnesium bromide tetrahydrofuran.

In a separate 250 mL four-necked flask, 23.5 g of anhydrous zinc chloride and 100 ml of tetrahydrofuran were placed, and the solution of 3,3-diethoxypropyl magnesium bromide tetrahydrofuran prepared above was added dropwise in an ice water bath at 0° C., continuing to stir for 2 h. The mixture was extracted with a saturated solution of ammonium chloride, and the mixture was kept still and partitioned; the organic layer was collected, the aqueous layer was extracted with 50 mL×2 of ethyl acetate, and ethyl acetate was concentrated by a vacuum rotation in the organic layer and distilled under a reduced pressure to obtain 26 g of 3,3-methyl diethoxypropyl methylphosphonate, with an HPLC purity of 96% and a reaction yield of 91%.

Preparation of 3,3-methyl Diethoxypropyl Methylphosphonate

Under the protection of nitrogen, 19.3 g of methyl chlorophosphonate monoester and 30 mL of tetrahydrofuran were added to a 250 mL three-necked flask; when the temperature was lowered to −40° C., a solution of 3,3-diethoxypropyl zinc bromide tetrahydrofuran was added dropwise, and after the addition, the reaction was kept at 0° C. for 2 h. The mixture was extracted with a saturated solution of catalytic amine, and the mixture was kept still and partitioned; the organic layer was collected, the aqueous layer was extracted with 30 mL×2 of ethyl acetate, and ethyl acetate was concentrated by a vacuum rotation in the organic layer and distilled under a reduced pressure to obtain 28 g of 3,3-methyl diethoxypropyl methylphosphonate, with an HPLC purity of 96% and a reaction yield of 90%.

What is claimed is:

1. A method for preparing 3,3-dialkoxypropyl methylphosphonate comprising the following steps:
    a methyl halogenated phosphonate monoester is reacted with a 3,3-dialkoxypropyl magnesium or zinc halide to obtain a 3,3-dialkoxypropyl methylphosphonate, with the reaction equation as shown in the following (I):

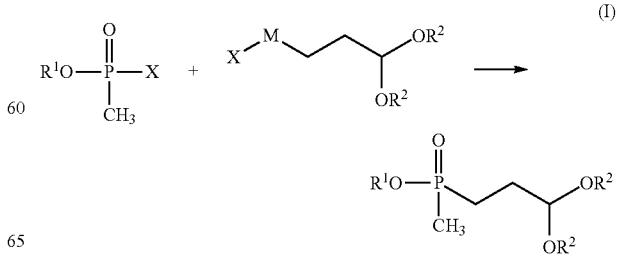

wherein $R^1$ and $R^2$ are an alkyl group of C1~C5, and $R^1$ and $R^2$ can be the same or different;

X is a halogen chlorine, bromine or iodine, and M is a metal magnesium or zinc.

2. The method according to claim 1, wherein two $R^2$ groups have capacity to be linked to an oxygen atom in a form of methylene, or to a group of —(CH$_2$)n-, in a 3~6-membered cyclic structure, wherein n=2, 3.

3. The method according to claim 2, wherein the 3~6-membered cyclic structure is

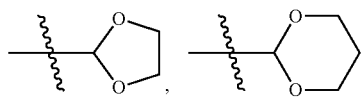 [SMILES: *C1OCCO1 ; *C1OCCCO1]

or a branched cyclic structure.

4. The method according to claim 3, wherein the branched cyclic structure is

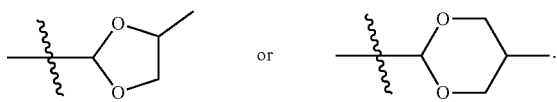

5. The method for according to claim 4, wherein temperature is −78° C.~80° C. when methylhalophosphonate monoester reacts with the 3,3-dialkoxypropyl magnesium or the zinc halide.

6. The method according to claim 5, wherein a molar ratio of the methylhalophosphonate monoester to the 3,3-dialkoxypropyl magnesium or the zinc halide is 1 mol:0.5~5 mol.

7. The method according to claim 5, wherein reaction time is 0.005~72 hours.

8. The method according to claim 1, wherein reaction solvent is one or more selected from the group consisting of a dialkyl ether a cycloalkane ether, ethylene glycol diether, alkanes, aromatic hydrocarbons, petroleum ether, silyl ether and gasoline solvent in reaction equation (I).

9. The method according to claim 8, wherein the dialkyl ether is one or more selected from the group consisting of methyl ether, diethyl ether, diisopropyl ether, di-n-butyl ether, methyl ethyl ether and methyl isopropyl ether; the cycloalkane ether is selected from the group consisting of tetrahydrofuran and dioxane; the aromatic ethers is selected from the group consisting of methyl phenyl ether and diphenyl ether; the ethylene glycol diether is selected from the group consisting of ethylene glycol dimethyl ether, ethylene glycol diethyl ether; the alkanes is selected from the group consisting of n-pentane, n-hexane, cyclopentane, cyclohexane and decahydronaphthalene; the aromatic hydrocarbons is selected from the group consisting of benzene, toluene, xylene and ethylbenzene.

\* \* \* \* \*